(12) United States Patent
Talach et al.

(10) Patent No.: US 8,248,245 B2
(45) Date of Patent: Aug. 21, 2012

(54) PROPINQUITY DETECTION BY PORTABLE DEVICES

(75) Inventors: David Talach, Sacramento, CA (US); David S. Kaplan, Ra'anana (IL)

(73) Assignee: Verifone, Inc., San Jose, CA (US)

( * ) Notice: Subject to any disclaimer, the term of this patent is extended or adjusted under 35 U.S.C. 154(b) by 295 days.

(21) Appl. No.: 12/407,292

(22) Filed: Mar. 19, 2009

(65) Prior Publication Data

US 2009/0237214 A1    Sep. 24, 2009

Related U.S. Application Data

(60) Provisional application No. 61/038,085, filed on Mar. 20, 2008.

(51) Int. Cl.
G08B 13/14 (2006.01)
(52) U.S. Cl. ............... 340/572.4; 340/572.1; 340/10.1; 340/539.3; 455/410
(58) Field of Classification Search ............ 340/10.1, 340/572.1–572.4, 539.3; 455/410, 412.2; 235/375, 376
See application file for complete search history.

(56) References Cited

U.S. PATENT DOCUMENTS

| | | | |
|---|---|---|---|
| 3,818,350 A | 6/1974 | Hiroshima et al. | |
| 5,627,520 A | 5/1997 | Grubbs et al. | |
| 5,675,319 A | 10/1997 | Rivenberg et al. | |
| 5,796,338 A * | 8/1998 | Mardirossian ............. 340/571 |
| 5,838,253 A | 11/1998 | Wurz et al. | |
| 5,963,134 A | 10/1999 | Bowers et al. | |
| 6,154,790 A | 11/2000 | Pruett et al. | |
| 6,170,059 B1 | 1/2001 | Pruett et al. | |
| 6,232,870 B1 | 5/2001 | Garber et al. | |
| 6,646,565 B1 | 11/2003 | Fu et al. | |
| 6,654,709 B2 * | 11/2003 | Aoshika et al. ............. 702/188 |
| 6,874,092 B1 | 3/2005 | Motoyama et al. | |
| 7,064,669 B2 * | 6/2006 | Light et al. ............. 340/573.1 |
| 7,170,409 B2 | 1/2007 | Ehrensvard et al. | |
| 7,240,824 B2 | 7/2007 | Stockton | |
| 2003/0005316 A1 | 1/2003 | Girard | |
| 2005/0184870 A1 | 8/2005 | Galperin et al. | |
| 2006/0250235 A1 | 11/2006 | Astrin | |
| 2007/0281664 A1 | 12/2007 | Kaneko et al. | |

FOREIGN PATENT DOCUMENTS

| | | |
|---|---|---|
| DE | 10049965 | 5/2002 |
| JP | 2006106831 | 4/2006 |
| JP | 2006148552 | 6/2006 |
| JP | 2006303747 | 11/2006 |
| JP | 2007013244 | 1/2007 |
| JP | 2007180936 | 7/2007 |
| JP | 2007235653 | 9/2007 |
| JP | 2008109442 | 5/2008 |
| KR | 100424626 | 3/2004 |

OTHER PUBLICATIONS

An Office Action dated Mar. 31, 2010, which issued during the prosecution of Applicant's U.S. Appl. No. 11/627,166.

* cited by examiner

*Primary Examiner* — Jennifer Mehmood
*Assistant Examiner* — Hongmin Fan
(74) *Attorney, Agent, or Firm* — Weingarten, Schurgin, Gagnebin & Lebovici LLP

(57) ABSTRACT

A point of sale (POS) terminal including a contactless transaction/identification card reader and a propinquity verifier, coupled to the contactless card reader and verifying at least predetermined propinquity of the POS terminal to a propinquity indication element.

20 Claims, 5 Drawing Sheets

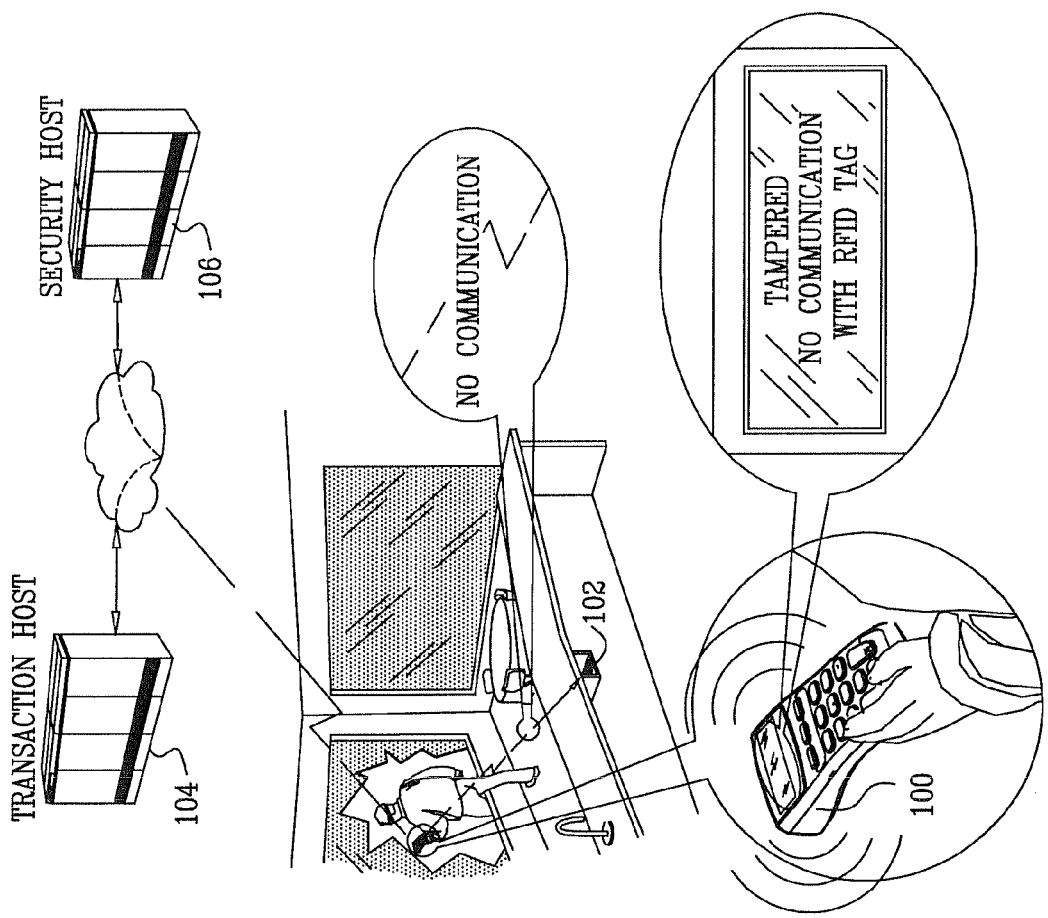
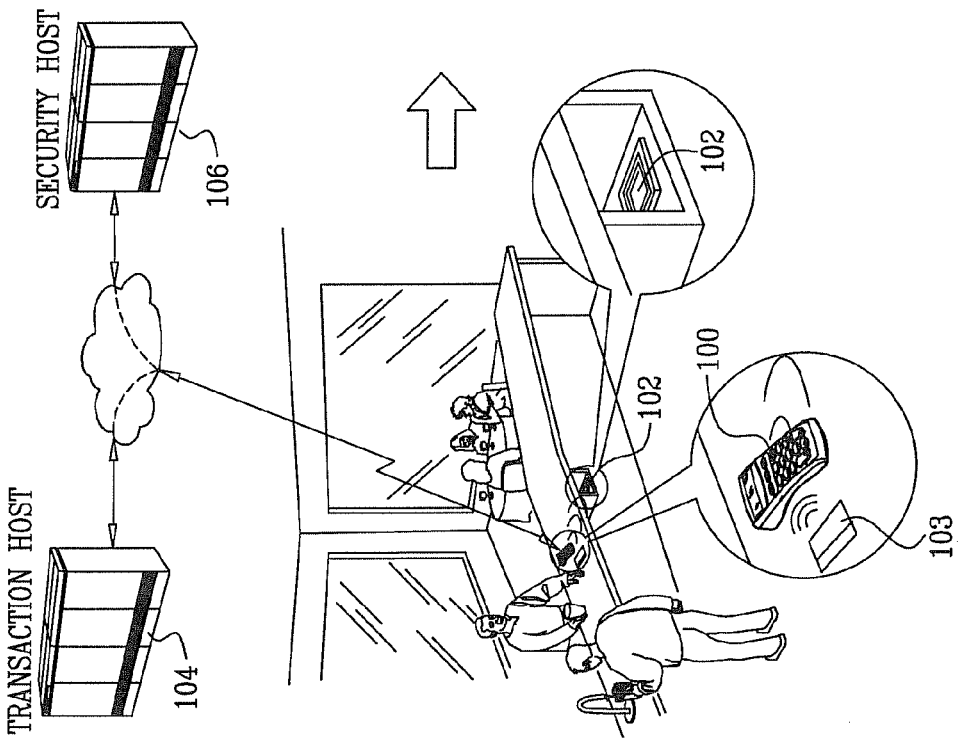
FIG. 1A

FIG. 1C
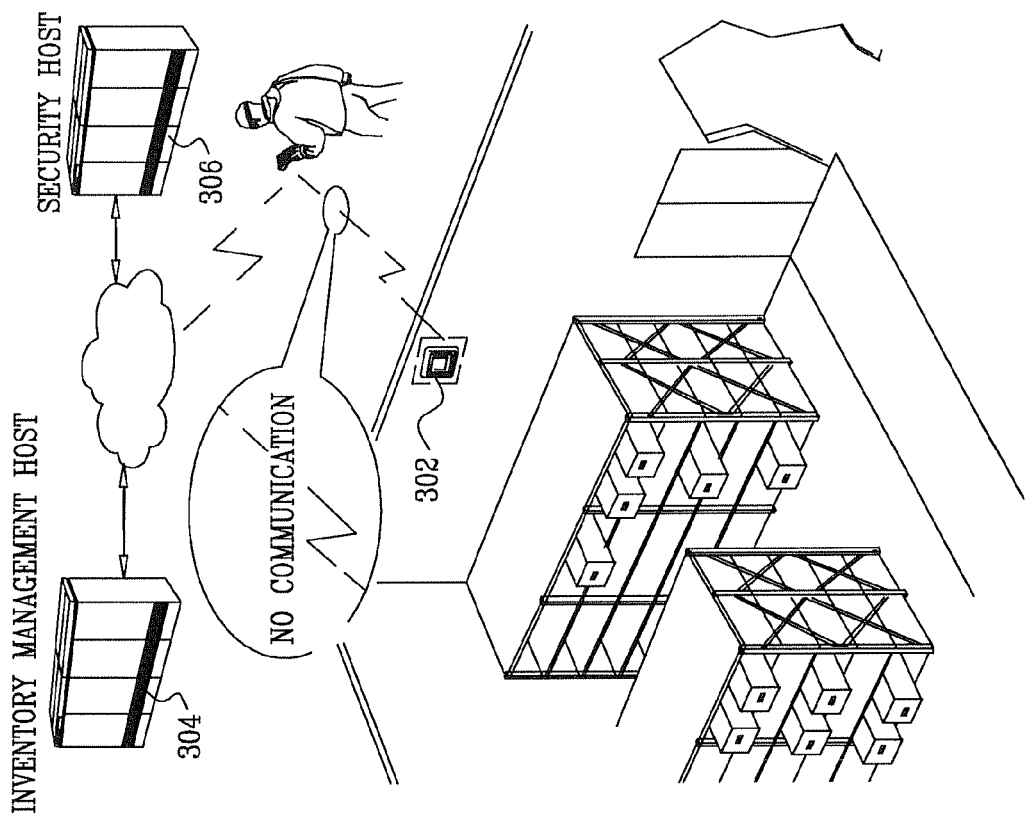
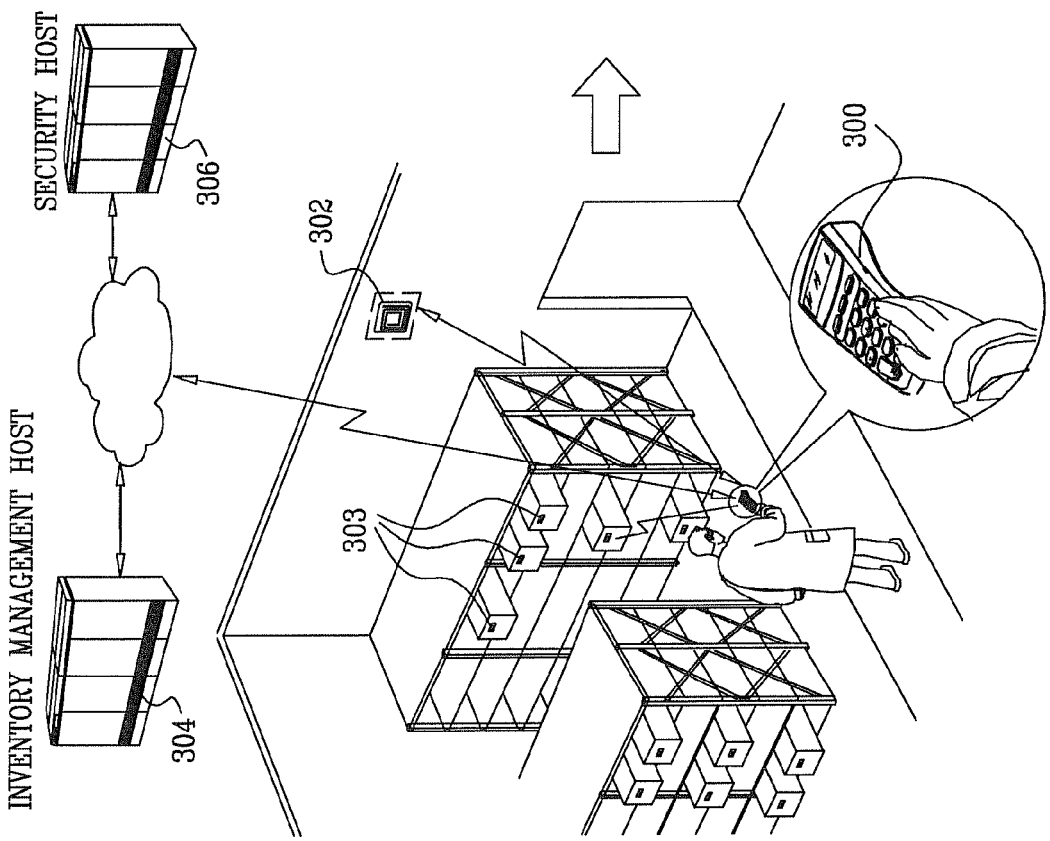

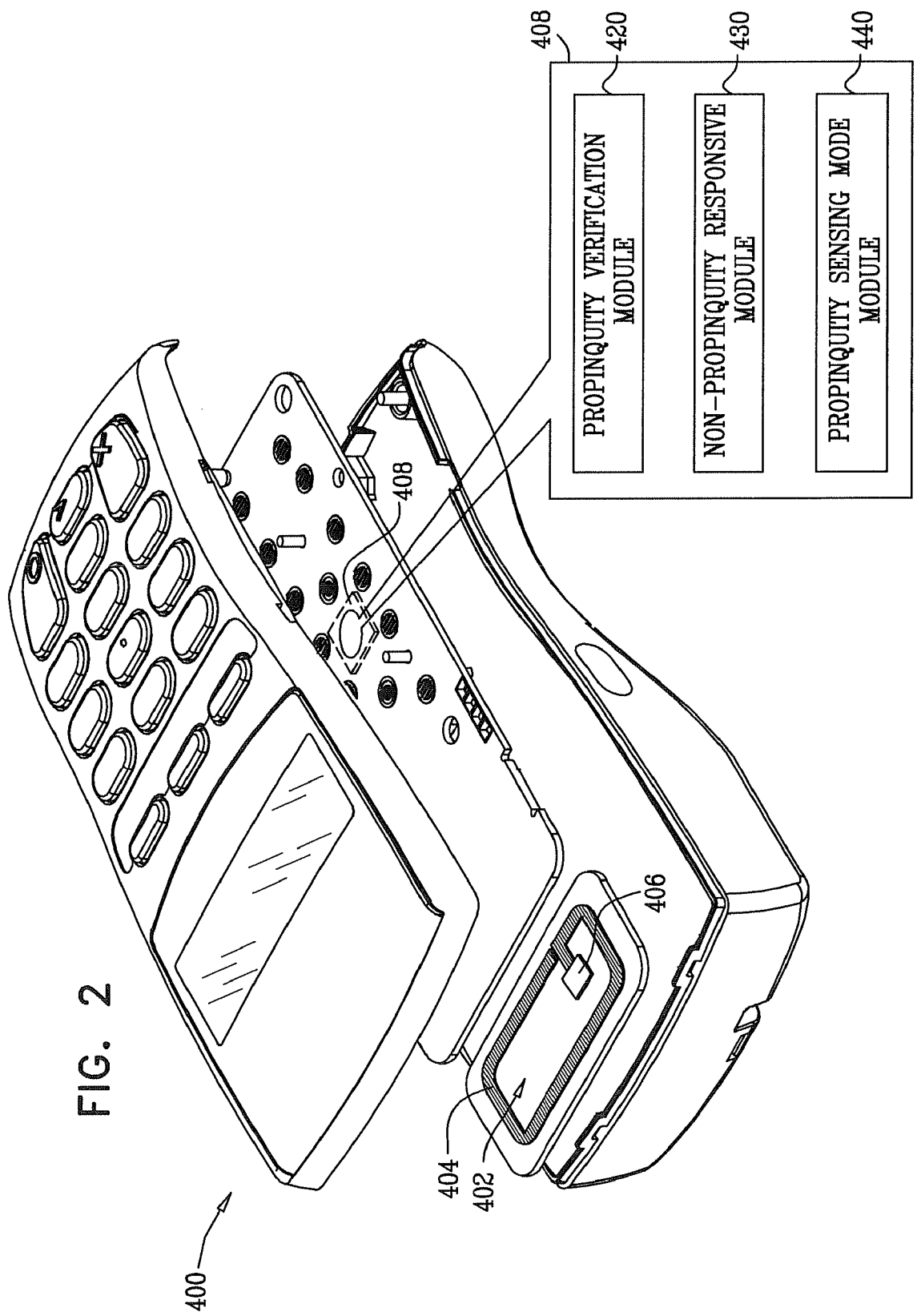

PROPINQUITY DETECTION BY PORTABLE DEVICES

REFERENCE TO RELATED APPLICATIONS

Reference is hereby made to U.S. Provisional Patent Application Ser. No. 61/038,085, filed Mar. 20, 2008, entitled Propinquity Detection by Portable Devices, the disclosure of which is hereby incorporated by reference and priority of which is hereby claimed pursuant to 37 CFR 1.78(a) (4) and (5)(i).

FIELD OF THE INVENTION

The present invention relates to RFID readers, systems and devices incorporating RFID readers generally and more generally to wireless short range communication readers, systems and devices incorporating wireless short range communication readers.

BACKGROUND OF THE INVENTION

The following patent publications are believed to represent the current state of the art:

U.S. Pat. Nos. 6,154,790; 6,232,870; 5,963,134; 5,838,253; 6,170,059 and 7,240,824;

U.S. patent publications applications 2003/0005316; 2006/0250235 and 2007/281664;

German patent application DE 10049965;

Japanese patent publications JP2006106831; JP2008109442; JP2007235653; JP2007180936; JP2007013244; JP2006148552 and JP 2006303747; and Korean patent publication KR 100424626.

SUMMARY OF THE INVENTION

The present invention seeks to provide an improved RFID reader and systems and devices incorporating RFID readers.

There is thus provided in accordance with a preferred embodiment of the present invention a point of sale (POS) terminal including a contactless transaction/identification card reader and a propinquity verifier, coupled to the contactless card reader and verifying at least predetermined propinquity of the POS terminal to a propinquity indication element.

Preferably, the POS terminal also includes protective functionality responsive to an output of the propinquity verifier for taking at least one protective measure in response to a lack of predetermined propinquity between the POS terminal and the propinquity indication element. Additionally, the at least one protective measure includes at least one of the following: disabling the POS terminal, providing a warning indicating lack of predetermined propinquity, providing an alarm indication and communicating an alarm indication to a remote host.

In accordance with a preferred embodiment of the present invention the POS terminal also includes a communicator communicating between at least the propinquity verifier and a computer network. Additionally, the communicator is employed for indicating at least one of sensed propinquity or sensed non-propinquity of the POS terminal.

Preferably, the propinquity verifier is embodied in a suitably programmed processor forming an integral part of the POS terminal and having POS functionality.

There is also provided in accordance with another preferred embodiment of the present invention a point of sale (POS) terminal system including a propinquity indication element and a POS terminal including a contactless transaction/identification card reader and a propinquity verifier for verifying propinquity of the POS terminal to the propinquity indication element.

In accordance with a preferred embodiment of the present invention the POS terminal system also includes protective functionality responsive to an output of the propinquity verifier for taking at least one protective measure in response to a lack of predetermined propinquity between the POS terminal and the propinquity indication element. Additionally, the at least one protective measure includes at least one of the following: disabling the POS terminal, providing a warning indicating lack of predetermined propinquity, providing an alarm indication and communicating an alarm indication to a remote host.

Preferably, the POS terminal system also includes a communications link between the propinquity verifier and a computer network. Additionally, the communications link is employed for indicating at least one of sensed propinquity or sensed non-propinquity of the POS terminal to the propinquity indication element.

In accordance with a preferred embodiment of the present invention the POS terminal system also includes at least one host computer communicating with the computer network. Additionally, the at least one host computer includes protective functionality responsive to an output of the propinquity verifier for taking at least one protective measure in response to a lack of predetermined propinquity between the POS terminal and the propinquity indication element. Additionally, the at least one protective measure includes at least one of the following: disabling the POS terminal, providing a warning indicating lack of predetermined propinquity, providing an alarm indication and communicating an alarm indication to a remote host.

There is further provided in accordance with yet another preferred embodiment of the present invention an access control terminal system including a propinquity indication element and an access control terminal including a contactless transaction/identification card reader and a propinquity verifier for verifying propinquity of the access control terminal to the propinquity indication element.

In accordance with a preferred embodiment of the present invention the access control terminal system also includes protective functionality responsive to an output of the propinquity verifier for taking at least one protective measure in response to a lack of predetermined propinquity between the access control terminal and the propinquity indication element. Additionally, the at least one protective measure includes at least one of the following: disabling the access control terminal, providing a warning indicating lack of predetermined propinquity, providing an alarm indication and communicating an alarm indication to a remote host.

There is yet further provided in accordance with still another preferred embodiment of the present invention an inventory control terminal system including a propinquity indication element and an inventory control terminal including a contactless transaction/identification card reader and a propinquity verifier for verifying propinquity of the inventory control terminal to the propinquity indication element.

In accordance with a preferred embodiment of the present invention the inventory control terminal system also includes protective functionality responsive to an output of the propinquity verifier for taking at least one protective measure in response to a lack of predetermined propinquity between the inventory control terminal and the propinquity indication element. Additionally, the at least one protective measure includes at least one of the following: disabling the inventory control terminal, providing a warning indicating lack of predetermined propinquity, providing an alarm indication and communicating an alarm indication to a remote host.

BRIEF DESCRIPTION OF THE DRAWINGS

The present invention will be understood and appreciated more fully from the following detailed description, taken in conjunction with the drawings in which:

FIG. 1A is a simplified pictorial illustration of a protected point of sale device system employing an RFID reader in a point of sale device and a fixed propinquity indication element;

FIG. 1C is a simplified pictorial illustration of an inventory control system employing a contactless transaction/identification card reader and a fixed propinquity indication element;

FIG. 2 is a simplified exploded view, partially schematic, partially pictorial illustration of a terminal, such as a point of sale device useful in the systems of FIGS. 1A-1C.

DETAILED DESCRIPTION OF PREFERRED EMBODIMENTS

Figure 1B:
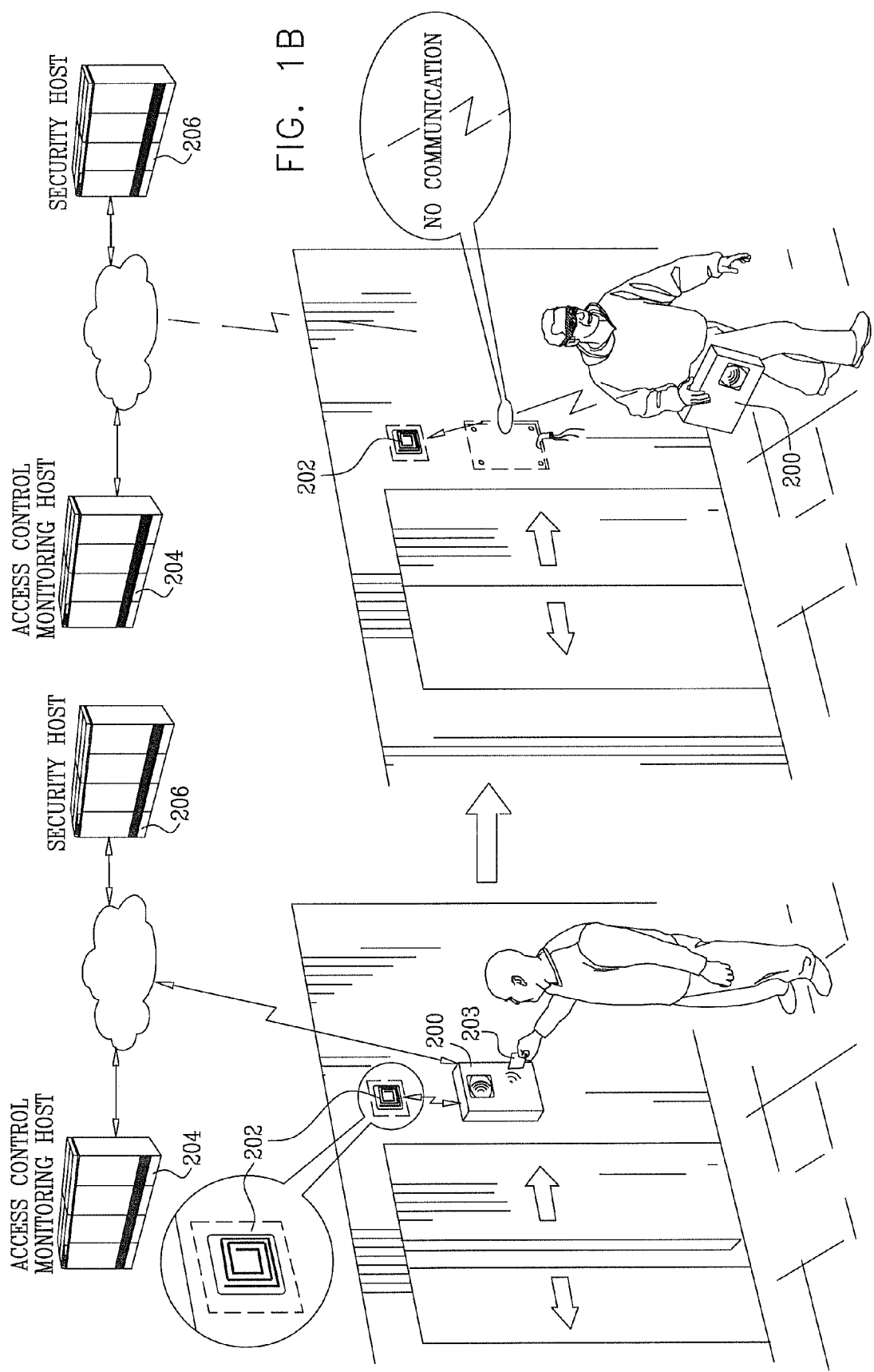
FIG. 1B is a simplified pictorial illustration of a protected access control system employing a contactless transaction/identification card reader and a fixed propinquity indication element.

Reference is now made to FIG. 1A, which is a simplified pictorial illustration of a protected point of sale (POS) device system employing a contactless transaction/identification card reader, preferably including RFID reader functionality, embodied in a point of sale device and a propinquity indication element, preferably employing RFID technology and preferably maintained in a fixed location.

The term "fixed" is used to indicate that the propinquity indication element is normally not intended to be readily removable and includes, inter alia, fixed mounting in a vehicle.

In the present specification and claims, the term "contactless transaction/identification card reader" refers to reader functionality for reading cards, tags or other similar items, including, without limitation, transaction cards, such as credit cards, debit cards, loyalty cards, prepaid cards, stored value cards and the like, and identification cards, such as access control cards, licenses, inventory identifiers, medical identification cards and the like.

As seen in FIG. 1A, a contactless reader equipped point of sale device 100 communicates with a propinquity indication element 102. Contactless reader equipped point of sale device 100 preferably includes an RFID reader, and is preferably a VERIFONE® Model PINpad 1000SE, and propinquity indication element 102 preferably comprises a conventional active or passive RFID transponder, usually including RFID circuitry and an antenna, such as a PDT17 with ISO 14443A IC, from Shanghai Huayuan Smart Information and Technologies Co., Ltd. Propinquity indication element 102 may be in any suitable form and is preferably located in an inconspicuous, hidden and/or inaccessible location near the usual working location of the point of sale device 100. Point of sale device 100 typically reads contactless transaction cards 103, such as credit cards, debit cards, loyalty cards, prepaid cards, stored value cards and the like.

In accordance with a preferred embodiment of the present invention, so long as communication is maintained between the point of sale device 100 and the propinquity indication element 102, the point of sale device 100 is enabled for operation in general and in a preferred embodiment of the invention, for communication with a remote transaction host 104. Further in accordance with a preferred embodiment of the present invention, once communication between the point of sale device 100 and the propinquity indication element 102 fails for at least a predetermined period, typically measured in seconds or minutes, the point of sale device 100 is preferably disabled for operation in general and, in a preferred embodiment of the invention, is disabled for normal communication with remote transaction host 104.

In accordance with a preferred embodiment of the present invention, communication between point of sale device 100 and the propinquity indication element 102 is maintained only so long as the point of sale device 100 is located within a predetermined degree of propinquity with respect to the propinquity indication element, typically a few centimeters. Alternatively, the predetermined degree of propinquity may be substantially larger, typically up to three meters.

Thus, as seen in FIG. 1A, if the point of sale device 100 is removed from its operational location as by a thief/hacker, communication between the point of sale device 100 and the fixed propinquity indication element 102 is interrupted and operation of the point of sale device 100 is disabled.

Additionally in accordance with an embodiment of the present invention, a remote security monitoring host 106 may be provided to monitor the security status of a multiplicity of point of sale devices 100. In such a case, if the point of sale device 100 is removed from its operational location as by a thief/hacker, communication between the point of sale device 100 and the fixed propinquity indication element 102 is interrupted and communication between the point of sale device 100 and the security monitoring host 106 may or may not be disabled. In either case, the security monitoring host 106 automatically becomes aware of the fact that communication between the point of sale device 100 and the fixed propinquity indication element 102 is interrupted, preferably within a few minutes.

Reference is now made to FIG. 1B, which is a simplified pictorial illustration of a protected access control system employing a contactless transaction/identification card reader, as defined above, preferably including RFID reader functionality embodied in an access control device, and a propinquity indication element, preferably employing RFID technology and preferably maintained in a fixed location.

As seen in FIG. 1B, a contactless reader equipped access control terminal 200, such as a ST-680 commercially available from Soca Technology of Taiwan, communicates with a propinquity indication element 202, such as a MT01 with Atmel T5557 IC, also from Shanghai Huayuan Smart Information and Technologies Co., Ltd., which may be in any suitable form and which is preferably located in an inconspicuous, hidden or inaccessible location near the usual working location of the access control terminal 200. Access control terminal 200 typically reads contactless access control identification cards 203.

Contactless reader equipped access control terminal 200 preferably includes an RFID reader, and propinquity indication element 202 preferably comprises a conventional active or passive RFID tag, usually including RFID circuitry and an antenna.

In accordance with a preferred embodiment of the present invention, so long as communication is maintained between the access control terminal 200 and the propinquity indication element 202, the access control terminal 200 is enabled for operation in general and in one embodiment of the invention, for communication with a remote access control monitoring host 204. Further in accordance with a preferred embodiment of the present invention, once communication between the access control terminal 200 and the propinquity indication element 202 fails for at least a predetermined period, typically measured in seconds or minutes, the access control terminal 200 is preferably disabled for operation in general and, in a preferred embodiment of the invention, is disabled for normal communication with remote access control monitoring host 204.

In accordance with a preferred embodiment of the present invention communication between the access control terminal 200 and the propinquity indication element 202 is maintained only so long as the access control terminal 200 is located within a predetermined degree of propinquity with respect to the element, typically a few centimeters. Alternatively, the predetermined degree of propinquity may be substantially larger, typically up to three meters.

Thus, as seen in FIG. 1B, if the access control terminal 200 is removed from its operational location as by a thief/hacker, communication between the access control terminal 200 and the propinquity indication element 202 is interrupted and operation of the access control terminal 200 is disabled.

Additionally in accordance with an embodiment of the present invention, a remote security monitoring host 206 may be provided to monitor the security status of a multiplicity of access control terminals 200. In such a case, if the access control terminal 200 is removed from its operational location as by a thief/hacker, communication between the access control terminal 200 and the fixed propinquity indication element 202 is interrupted and communication between the access control terminal 200 and the security monitoring host 206 may or may not be disabled. In either case, the security monitoring host 206 automatically becomes aware of the fact that communication between the access control terminal 200 and the propinquity indication element 202 is interrupted, preferably within a few seconds.

Reference is now made to FIG. 1C, which is a simplified pictorial illustration of a protected inventory control system employing a contactless transaction/identification card reader, as defined above, preferably including RFID reader functionality, embodied in an inventory control device and a propinquity indication element, preferably employing RFID technology and preferably maintained in a fixed location. As seen in FIG. 1C, an inventory control device 300 communicates with a conventional propinquity indication element 302, which may be in any suitable form and which is preferably located in an inconspicuous, hidden and/or inaccessible location near the usual working location of the inventory control device 300. Inventory control device 300 typically reads contactless inventory control identification tags 303 attached to goods or other suitable types of inventory control indicators associated otherwise associated with the goods.

In accordance with a preferred embodiment of the present invention, so long as communication is maintained between the equipped inventory control device 300 and the propinquity indication element 302, the inventory control device 300 is enabled for operation in general and, in a preferred embodiment of the invention, for communication with a remote inventory management host 304. Further in accordance with a preferred embodiment of the present invention, once communication between the inventory control device 300 and the propinquity indication element 302 fails for at least a predetermined period, typically measured in seconds or minutes, the inventory control device 300 is preferably disabled for operation in general and in a preferred embodiment of the invention, is disabled for normal communication with remote inventory management host 304.

In accordance with a preferred embodiment of the present invention communication between inventory control device 300 and the propinquity indication element 302 is maintained only so long as the inventory control device 300 is located within a predetermined degree of propinquity with respect to the propinquity indication element, typically up to three meters.

Thus, as seen in FIG. 1C, if the inventory control device 300 is removed from its operational location as by a thief/hacker, communication between the inventory control device 300 and the fixed propinquity indication element 302 is interrupted and operation of the inventory control device 300 is disabled.

Additionally in accordance with an embodiment of the present invention, a remote security monitoring host 306 may be provided to monitor the security status of a multiplicity of inventory control devices 300. In such a case, if the inventory control device 300 is removed from its operational location as by a thief/hacker, communication between the inventory control device 300 and the fixed propinquity indication element 302 is interrupted and communication between the inventory control device 300 and the security monitoring host 306 may or may not be disabled. In either case, the security monitoring host 306 automatically becomes aware of the fact that communication between the inventory control device 300 and the fixed propinquity indication element 302 is interrupted, preferably within less than one minute.

Reference is now made to FIG. 2, which is a simplified exploded view, partially schematic, partially pictorial illustration of a protected device 400 useful in the system of FIGS. 1A-1C. Protected device 400 may be based on a point of sale device as shown, such as a VERIFONE® Model PINpad 1000SE, or alternatively an access control device or an inventory control device.

Protected device 400 preferably includes a contactless reader 402, including an antenna 404 and downstream filtering, tuning, amplification and transceiver circuitry 406, and a microprocessor 408, having conventional software providing the conventional functionality of the protected device, e.g. POS functionality, access control functionality and inventory control functionality. In accordance with a preferred embodiment of the present invention, additional software is provided for operation of the microprocessor 408 which is not included in conventional devices of this type.

This additional software preferably includes one or more of the following modules:

a propinquity verification module 420 which senses propinquity of the protected device 400 to a propinquity indication element, such as elements 102, 202 and 302 (FIGS. 1A, 1B & 1C, respectively);

a non-propinquity responsive module 430, which carries out protective measures in response to non-propinquity of the protected device 400 to the propinquity indication element;

a propinquity sensing mode module 440 which adjusts the operation of at least one of, and preferably all of, antenna 404; downstream filtering, tuning, amplification and transceiver circuitry 406 and microprocessor 408 to operate in a propinquity sensing mode at predetermined times.

Propinquity verification module 420 may operate in one of a number of possible ways. For example, propinquity verification module 420 may periodically send signals to the propinquity indication element, await acknowledgements thereof and, in the absence of receipt of such acknowledgements, provide an output indication of non-propinquity. Alternatively, propinquity verification module 420 may sense the arrival of periodic signal transmissions from the propinquity indication element and, in the absence of receipt thereof, provide an output indication of non-propinquity. Propinquity verification module 420 may also administer various security protocols to ensure the authenticity of the periodic signal transmissions that it receives.

Non-propinquity responsive module 430 may also operate in one of a number of possible ways. For example, in response to receipt of an output indication of non-propinquity from propinquity verification module 420, it may disable the device 400, change its functionality, render it hack-resistant, erase sensitive information contained therein and/or provide an audio or visual alarm indication or an alarm indication to an external host. Alternatively or additionally, initially it may be operative to modify the functionality of device 400 to a caution state functionality and only after a predetermined duration in a non-propinquity state, further modify the functionality of device 400 to a non-functional or fully disabled or erased state.

Propinquity sensing mode module 440 preferably operates the device 400 intermittently, such as once each minute, in a propinquity sensing mode wherein the operation of at least one of, and preferably all of, antenna 404; downstream filtering, tuning, amplification and transceiver circuitry 406 and microprocessor 408 is adapted to function so as to enable propinquity sensing mode. In practice, this may include enhancing the operational range of the device 400 so as to detect signals from a distance greater than the usual detection distance of the device. In addition, this typically includes adaptation of the operation of the transceiver and microprocessor to process signals received by the device in the propinquity sensing mode for enabling operation of the propinquity verification module 420.

Module 440 typically is operative to switch communication protocols between a conventional operational mode of device, such as a transaction mode for communication with transaction card 103 (FIG. 1A), to operation in the propinquity sensing mode for communication with the propinquity indication element 102 (FIG. 1A).

Where protected device 400 is operational both for contactless card reading and for propinquity assurance communication, it is preferably equipped with an enhanced range RFID communications antenna 404 and suitable filtering and tuning circuitry. Propinquity sensing mode module 440 preferably controls transmitted signal strength and/or received signal sensitivity. This enables protected device 400 to communicate both with conventional contactless cards, such as transaction card 103 (FIG. 1A), over a range of a few inches by lowering the transmitted signal strength and switching the communication protocol to that suitable for contactless card reading, and with propinquity indication element 302 (FIG. 1C), which is further away, by increasing the transmitted signal strength and/or received signal sensitivity and switching the communication protocol to that suitable for communication with a propinquity identification element.

The point of sale device 400 may also include software and/or hardware suitable for long-range communication such as via a landline or wireless communication link for enabling communication with a security host, such as security host 106 (FIG. 1A). The access control system of FIG. 1B and the inventory control system of FIG. 1C may also be similarly equipped.

It is also appreciated that the device 400 may communicate with multiple propinquity indication elements. A non-propinquity state may be deemed to exist when communication between the device 400 and any one or more or all of the multiple propinquity indication elements is lost. The access control system and the inventory control system may also be similarly operative.

Figure 3:
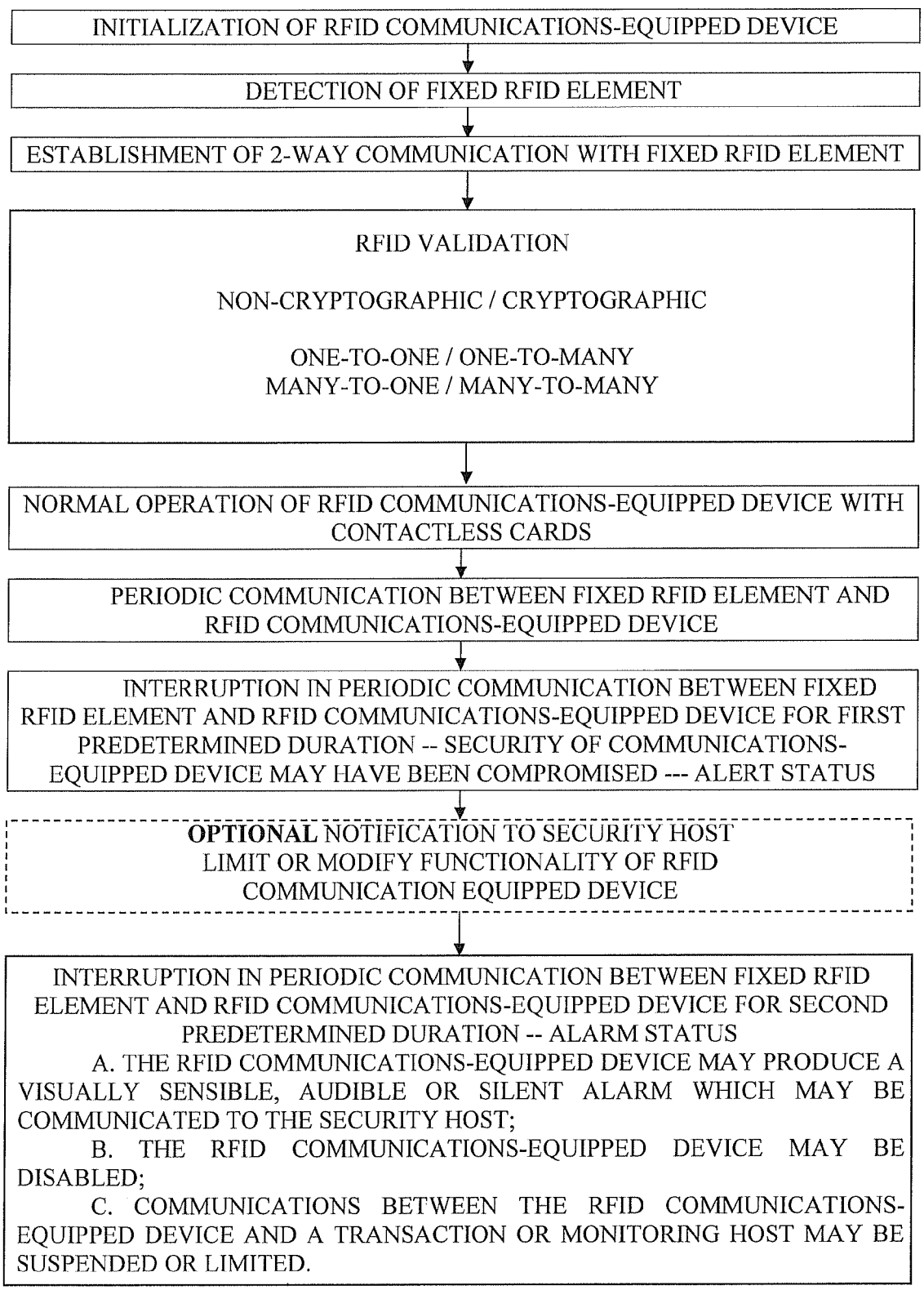
FIG. 3 is a simplified generalized flowchart illustrating the operation of system incorporating a contactless transaction/identification card reader in accordance with a preferred embodiment of the present invention.

Reference is now made to FIG. 3, which is a simplified generalized flowchart illustrating the operation of protected apparatus, such as the devices and terminal illustrated in FIGS. 1A-1C and FIG. 2 and described hereinabove.

As seen in FIG. 3, the device is initialized in a conventional manner and detects a fixed RFID propinquity indication element, such as propinquity indication element 102 (FIG. 1A), propinquity indication element 202 (FIG. 1B) and propinquity indication element 302 (FIG. 1C), and establishes communication therewith. A propinquity verification process follows which confirms the genuineness of the signals purportedly received from the fixed propinquity indication element. This verification process may or may not employ cryptographic functionality for authentication of the fixed propinquity indication element. It is appreciated that the fixed propinquity indication element may or may not have computational capabilities.

It is further appreciated that the validation may be on a one-to-one basis, e.g. that each propinquity indication element is accredited to a single device or alternatively on a one-to-many, many-to-one or many-to-many basis.

Once validation of the fixed propinquity indication element has been completed, communication between the fixed propinquity indication element and the device takes place periodically with any suitable periodicity and may be initiated by either the fixed propinquity indication element or by the device. A security host may receive periodic confirmations of the existence of communication between one or more fixed propinquity indication elements and one or more devices.

Typically normal operation of the device with contactless transaction/identification cards takes place unless a non-propinquity state exists.

If the device is moved to a location out of communication range with the fixed propinquity indication element, and communication with the fixed propinquity indication element is interrupted for at least a first predetermined time, the device may enter an alert state and a suitable notification may be provided automatically to a security host. Alternatively, the alert state may be activated by the security host. During such time as the device is in an alert state, its functions may be limited or modified to take into account that its security may have been compromised.

If the interruption of communication continues for at least a second predetermined time, one or more of the following scenarios may take place and may be initiated either by the device or by the security host:

A. The device may produce a visually sensible, audible or silent alarm which may be communicated to the security host;

B. The device may be disabled; and

C. Communications between the device and a transaction or monitoring host may be suspended or limited.

The present invention is also applicable to systems wherein RFID communications is replaced by other suitable short range communications, such as BLUETOOTH®, WI-FI® and ZIGBEE®. For example, a point of sale device, an access control device or an inventory control device may carry out a function via one of the above alternative short range communications protocols and may additionally use the same short range communications technologies for propinquity monitoring. A specific example can be a portable point of sale device communicating via WI-FI® with a base station for transmittal and receipt of transaction information and which also uses WI-FI® for propinquity monitoring with respect to a fixed WI-FI® signal source, i.e. to detect theft of the portable point of sale device. Another specific example is a portable shopping assistant used in a large store to enable customers to receive answers to merchandise queries and which communicates via BLUETOOTH® with a base station for transmittal and receipt of queries and information and which also uses for propinquity monitoring with respect to a fixed BLUETOOTH® signal source, i.e. to detect theft of the portable shopping assistant device.

Throughout the description, the term "RFID" is used to refer to a specific class of technologies used to transmit information over short distances, such as the technologies described in ISO 14443, ISO 18092, ISO 15693 and ISO 10536. It some cases, these technologies are referred by their usage or specific jargon, such as "contactless payment", "contactless transactions", "contactless communications", Near Field Communications (NFC) or other terms as may be found in a particular industry which uses RFID technology for specific purposes.

It will be appreciated by persons skilled in the art that the present invention is not limited by what has been particularly shown and described hereinabove. Rather the present invention includes both combinations and subcombinations of various features described hereinabove as well as modifications and variations thereof which would occur to a person skilled in the art upon reading the foregoing and which are not in the prior art.

The invention claimed is:

1. A point of sale (POS) terminal comprising:
a contactless transaction/identification card reader, at least part of said contactless transaction/identification card reader being operative to enable operation of said card reader in a transaction mode for contactless card reading and in a propinquity sensing mode for sensing propinquity with an external propinquity indication element; and
a propinquity verifier operative in said propinquity sensing mode for verifying that said POS terminal has at least predetermined propinquity to said external propinquity indication element,
said contactless transaction/identification card reader comprising a propinquity sensing module and an antenna, said propinquity sensing module being operative to control at least one of transmitted signal strength and received signal sensitivity, whereby said contactless transaction/identification card reader is enabled;
in said transaction mode to communicate with conventional contactless cards over a range of a few inches by lowering the transmitted signal strength and employing a first communication protocol which is suitable for contactless card reading; and
in said propinquity sensing mode to communicate with said external propinquity indication element by increasing at least one of the transmitted signal strength and received signal sensitivity and employing a second communication protocol which is suitable for communication with said external propinquity indication element.

2. A POS terminal according to claim 1 and also comprising protective functionality responsive to an output of said propinquity verifier for taking at least one protective measure in response to a lack of predetermined propinquity between said POS terminal and said propinquity indication element.

3. A POS terminal system according to claim 2 and wherein said at least one protective measure includes at least one of the following:
disabling said POS terminal;
providing a warning indicating lack of predetermined propinquity;
providing an alarm indication; and
communicating an alarm indication to a remote host.

4. A POS terminal according to claim 1 and also comprising a communicator communicating between at least said propinquity verifier and a computer network.

5. A POS terminal according to claim 4 and wherein said communicator is employed for indicating at least one of sensed propinquity or sensed non-propinquity of said POS terminal.

6. A POS terminal according to claim 1 and wherein said propinquity verifier is embodied in a suitably programmed processor forming an integral part of said POS terminal and having POS functionality.

7. A point of sale (POS) terminal system comprising:
an external propinquity indication element; and
a POS terminal comprising:
a contactless transaction/identification card reader, at least part of said contactless transaction/identification card reader being operative to enable operation of said card reader in a transaction mode for contactless card reading and in a propinquity sensing mode for sensing propinquity with said external propinquity indication element; and
a propinquity verifier operative in said propinquity sensing move for verifying that said POS terminal has at least predetermined propinquity to said external propinquity indication element,
said contactless transaction/identification card reader comprising a propinquity sensing module and an antenna, said propinquity sensing module being operative to control at least one of transmitted signal strength and received signal sensitivity, whereby said contactless transaction/identification card reader is enabled;
in said transaction mode to communicate with conventional contactless cards over a range of a few inches by lowering the transmitted signal strength and employing a first communication protocol which is suitable for contactless card reading; and
in said propinquity sensing mode to communicate with said external propinquity indication element by increasing at least one of the transmitted signal strength and received signal sensitivity and employing a second communication protocol which is suitable for communication with said external propinquity indication element.

8. A POS terminal system according to claim 7 and also comprising protective functionality responsive to an output of said propinquity verifier for taking at least one protective measure in response to a lack of predetermined propinquity between said POS terminal and said propinquity indication element.

9. A POS terminal system according to claim 8 and wherein said at least one protective measure includes at least one of the following:
disabling said POS terminal;
providing a warning indicating lack of predetermined propinquity;
providing an alarm indication; and
communicating an alarm indication to a remote host.

10. A POS terminal system according to claim 7 and also comprising a communications link between said propinquity verifier and a computer network.

11. A POS terminal system according to claim 10 and wherein said communications link is employed for indicating at least one of sensed propinquity or sensed non-propinquity of said POS terminal to said propinquity indication element.

12. A POS terminal system according to claim 11 and also comprising at least one host computer communicating with said computer network.

13. A POS terminal system according to claim 12 and wherein said at least one host computer comprises protective functionality responsive to an output of said propinquity verifier for taking at least one protective measure in response to a lack of predetermined propinquity between said POS terminal and said propinquity indication element.

14. A POS terminal system according to claim 13 and wherein said at least one protective measure includes at least one of the following:
    disabling said POS terminal;
    providing a warning indicating lack of predetermined propinquity;
    providing an alarm indication; and
    communicating an alarm indication to a remote host.

15. An access control terminal system comprising:
    an external propinquity indication element; and
    an access control terminal comprising:
        a contactless transaction/identification card reader, at least part of said contactless transaction/identification card reader being operative to enable operation of said card reader in a transaction mode for contactless card reading and in a propinquity sensing mode for sensing propinquity with said external propinquity indication element; and
        a propinquity verifier operative in said propinquity sensing move for verifying that said POS terminal has at least predetermined propinquity to said external propinquity indication element,
    said contactless transaction/identification card reader comprising a propinquity sensing module and an antenna, said propinquity sensing module being operative to control at least one of transmitted signal strength and received signal sensitivity, whereby said contactless transaction/identification card reader is enabled;
        in said transaction mode to communicate with conventional contactless cards over a range of a few inches by lowering the transmitted signal strength and employing a first communication protocol which is suitable for contactless card reading; and
        in said propinquity sensing mode to communicate with said external propinquity indication element by increasing at least one of the transmitted signal strength and received signal sensitivity and employing a second communication protocol which is suitable for communication with said external propinquity indication element.

16. An access control terminal system according to claim 15 and also comprising protective functionality responsive to an output of said propinquity verifier for taking at least one protective measure in response to a lack of predetermined propinquity between said access control terminal and said propinquity indication element.

17. An access control terminal system according to claim 16 and wherein said at least one protective measure includes at least one of the following:
    disabling said access control terminal;
    providing a warning indicating lack of predetermined propinquity;
    providing an alarm indication; and
    communicating an alarm indication to a remote host.

18. An inventory control terminal system comprising:
    an external propinquity indication element; and
    an inventory control terminal comprising:
        a contactless transaction/identification card reader, at least part of said contactless transaction/identification card reader being operative to enable operation of said card reader in a transaction mode for contactless card reading and in a propinquity sensing mode for sensing propinquity with said external propinquity indication element; and
        a propinquity verifier operative in said propinquity sensing move for verifying that said POS terminal has at least predetermined propinquity to said external propinquity indication element,
    said contactless transaction/identification card reader comprising a propinquity sensing module and an antenna, said propinquity sensing module being operative to control at least one of transmitted signal strength and received signal sensitivity, whereby said contactless transaction/identification card reader is enabled;
        in said transaction mode to communicate with conventional contactless cards over a range of a few inches by lowering the transmitted signal strength and employing a first communication protocol which is suitable for contactless card reading; and
        in said propinquity sensing mode to communicate with said external propinquity indication element by increasing at least one of the transmitted signal strength and received signal sensitivity and employing a second communication protocol which is suitable for communication with said external propinquity indication element.

19. An inventory control terminal system according to claim 18 and also comprising protective functionality responsive to an output of said propinquity verifier for taking at least one protective measure in response to a lack of predetermined propinquity between said inventory control terminal and said propinquity indication element.

20. An inventory control terminal system according to claim 19 and wherein said at least one protective measure includes at least one of the following:
    disabling said inventory control terminal;
    providing a warning indicating lack of predetermined propinquity;
    providing an alarm indication; and
    communicating an alarm indication to a remote host.

* * * * *